(12) United States Patent
Tamura

(10) Patent No.: US 6,914,754 B2
(45) Date of Patent: Jul. 5, 2005

(54) HEAD FEEDING MECHANISM

(75) Inventor: Kazuya Tamura, Isehara (JP)

(73) Assignee: Mitsumi Electric Co., Ltd., Chofu (JP)

( * ) Notice: Subject to any disclaimer, the term of this patent is extended or adjusted under 35 U.S.C. 154(b) by 314 days.

(21) Appl. No.: 10/243,098

(22) Filed: Sep. 12, 2002

(65) Prior Publication Data

US 2003/0053259 A1 Mar. 20, 2003

(30) Foreign Application Priority Data

Sep. 14, 2001 (JP) ............................ 2001-279092

(51) Int. Cl.$^7$ ............................ G11B 5/584; G11B 5/55; G11B 21/02
(52) U.S. Cl. ............. 360/261.3; 360/75; 360/260; 360/261.1; 74/89.42
(58) Field of Search ............... 360/261.3, 267.3, 360/267.4, 291.2, 291.3, 266.2, 294.2, 114.1, 123, 128, 129; 369/219, 223

(56) References Cited

U.S. PATENT DOCUMENTS

| | | | |
|---|---|---|---|
| 1,319,687 A | | 10/1919 | Bates |
| 3,736,397 A | | 5/1973 | Pederson |
| 3,787,837 A | | 1/1974 | Allen et al. |
| 3,944,042 A | | 3/1976 | Gremillet |
| 4,144,549 A | * | 3/1979 | Burdorf et al. .......... 360/78.02 |
| 4,210,959 A | * | 7/1980 | Wozniak .................. 710/74 |
| 4,362,408 A | | 12/1982 | Cordes et al. |

(Continued)

FOREIGN PATENT DOCUMENTS

| | | | | |
|---|---|---|---|---|
| JP | 53/147273 | * | 11/1978 | ............ G11B/5/55 |
| JP | 01158678 A | * | 6/1989 | ............ G11B/21/02 |
| JP | 2000-100025 A | | 4/2000 | |
| JP | 2000-149491 A | | 5/2000 | |
| JP | 2001279092 A | * | 10/2001 | ............ C08L/77/06 |
| JP | 2003085721 A | * | 3/2003 | ............ G11B/5/584 |
| WO | WO 86/07295 A1 | | 12/1986 | |
| WO | WO 86/07471 A1 | | 12/1986 | |
| WO | WO 90/10288 | * | 9/1990 | ............ G11B/5/55 |
| WO | WO 97/21547 | | 6/1997 | |
| WO | 2000-100116 A | | 4/2000 | |
| WO | WO 00/73078 A1 | | 12/2000 | |
| WO | WO 02/34539 A1 | | 5/2002 | |

OTHER PUBLICATIONS

Tamura, k. Head feeding mechanism for head actuator assembly in tape drive, includes backlash preventing mechanism, DERWENT–ACC–NO: 2003–419586, Mar. 20, 2003.*

Publications QIC development standard, QIC–139, rev. G, Aug. 1994.*

IBM Tech, Disc. Bull., D. S. Proper, Accurately positioning transducers with respect to rotating disks, vol. 18, No. 7, Dec. 1975, p. 2066.*

IBM Tech. Disc. Bull., F. G. Anders, Software–Hardware dual mode servo, vol. 20, No. 1, Jun. 1977, pp. 63–64.*

Primary Examiner—Cuong Nguyen
(74) Attorney, Agent, or Firm—Frishauf, Holtz, Goodman & Chick, P.C.

(57) ABSTRACT

A head lift body (42) with a head assembly (30) mounted thereon has a nut (45) engaged with a lead screw (41). The head lift body has an integral structure formed by resin molding with a through hole, a hollow opening, and a guide portion (47). The through hole receives the lead screw inserted therethrough. The hollow opening is formed at the center of the head lift body to accommodate a backlash preventing mechanism (43). The guide portion inhibits the rotation of the head lift body and guides the head lift body moving up and down along a rotation center axis of the lead screw. The backlash preventing mechanism comprises a preload bushing (431) and a preload spring (432). The preload bushing has an internal thread to be engaged with the external thread of the lead screw. The preload spring presses the head lift body against the preload bushing along the rotation center axis of the lead screw.

6 Claims, 8 Drawing Sheets

U.S. PATENT DOCUMENTS

| | | | |
|---|---|---|---|
| 4,661,005 A | | 4/1987 | Lahr |
| 4,688,020 A | | 8/1987 | Kuehneman et al. |
| 4,791,257 A | | 12/1988 | Frey et al. |
| 4,906,117 A | | 3/1990 | Birdwell |
| 5,091,808 A | * | 2/1992 | Nigam ................ 360/78.05 |
| 5,105,322 A | * | 4/1992 | Steltzer ................ 360/261.3 |
| 5,144,302 A | | 9/1992 | Carter et al. |
| 5,191,492 A | * | 3/1993 | Nayak et al. ........... 360/78.02 |
| 5,220,318 A | | 6/1993 | Staley |
| 5,270,886 A | * | 12/1993 | Nigam ................ 360/78.05 |
| 5,414,585 A | | 5/1995 | Saliba |
| 5,434,566 A | | 7/1995 | Iwasa et al. |
| 5,448,438 A | * | 9/1995 | Kasetty ................ 360/261.3 |
| 5,494,363 A | | 2/1996 | Hochgesang |
| 5,588,760 A | | 12/1996 | So |
| 5,676,476 A | | 10/1997 | Uke |
| 5,790,103 A | | 8/1998 | Willner |
| 5,793,574 A | * | 8/1998 | Cranson et al. .......... 360/261.3 |
| 5,857,634 A | | 1/1999 | Hertrich |
| 5,862,014 A | | 1/1999 | Nute |
| 5,865,546 A | | 2/1999 | Ganthier et al. |
| 5,933,133 A | | 8/1999 | Lohr |
| 5,954,437 A | | 9/1999 | Wen-Hung |
| 5,978,177 A | * | 11/1999 | Takasugi ............... 360/245.9 |
| 6,104,604 A | | 8/2000 | Anderson et al. |
| 6,241,171 B1 | | 6/2001 | Gaboury |
| 6,697,229 B2 | * | 2/2004 | Tamura et al. .......... 360/261.3 |
| 6,704,169 B2 | * | 3/2004 | Nawa ................... 360/261.3 |

* cited by examiner

HEAD FEEDING MECHANISM

BACKGROUND OF THE INVENTION

This invention relates to a head feeding mechanism of a magnetic head actuator assembly for use in a linear magnetic tape storage system represented by a DLT (digital liner tape) or a LTO (linear tape open) and, in particular, to a head feeding mechanism which is capable of assuring a stable tape contact force and of avoiding tape backlash with a simple and inexpensive mechanism and which is low in cost and small in number of assembling steps.

A linear magnetic tape storage system (magnetic recording/reproducing apparatus) of the type has been developed as a backup for a memory device (e.g. a hard disk) of a computer system. Various types of linear magnetic tape storage systems have already been proposed. For example, a digital linear tape drive as a DLT is disclosed in U.S. Pat. No. 5,862,014.

The digital linear tape drive (which may simply be called "tape drive") is adapted to receive a tape cartridge having a single reel (supply reel) and contains a take-up reel in the interior thereof. When the tape cartridge is loaded in the tape drive, a magnetic tape is pulled out of the tape cartridge and taken up by the take-up reel through a head guide assembly (HGA). The head guide assembly serves to guide the magnetic tape pulled out of the tape cartridge to a magnetic head. The magnetic head exchanges information between the magnetic tape and the magnetic head. The head guide assembly generally comprises a boomerang-shaped aluminum plate and six large guide rollers each of which comprises a bearing.

The head guide assembly is also called a tape guide assembly and is disclosed, for example, in U.S. Pat. No. 5,414,585. An example of the guide roller is disclosed in Japanese Unexamined Patent Publication No. 2000-100025 (JP 2000-100025 A).

As disclosed, for example, in U.S. Pat. No. 5,793,574, the tape drive is generally comprised of a rectangular housing that has a common base. The base has two spindle motors (reel motors). The first spindle motor has a spool (take-up reel) permanently mounted on the base. The spool is dimensioned to accept a relatively high speed streaming magnetic tape. The second spindle motor (reel motor) is adapted to accept a removable tape cartridge. The removable tape cartridge is manually or automatically inserted into the drive via a slot formed on the drive's housing. Upon insertion of the tape cartridge into the slot, the tape cartridge engages with the second spindle motor (reel motor).

Prior to rotation of the first and the second spindle motors, the tape cartridge is connected to the permanently mounted spool (take-up reel) by means of a mechanical buckling mechanism. A number of rollers (guide rollers) positioned intermediate the tape cartridge and the permanently mounted spool guide the magnetic tape as it traverses at relatively high speeds back and forth between the tape cartridge and the permanently mounted spool.

The digital linear tape drive having the above-mentioned structure requires a pulling apparatus for pulling the magnetic tape from the supply reel to the take-up reel. Such a pulling apparatus is disclosed, for example, in International Publication No. WO 86/07471. According to WO 86/07471, take up leader means (first tape leader) is coupled to the take-up reel while supply tape leader means (second tape leader) is fixed to the tape on the supply reel. The first tape leader has a mushroom-like tab formed at its one end. The second tape leader has a locking hole. The tab is engaged with the locking hole.

Furthermore, a mechanism for joining the first tape leader to the second tape leader is required. Such a joining mechanism is disclosed, for example, in International Publication No. WO 86/07295.

Japanese Unexamined Patent Publication No. 2000-100116 (JP 2000-100116 A) discloses "Structure of Leader Tape Engaging Part". In this structure, an end of a leader tape (second tape leader) can be locked to a tape end hooking part of a tape cartridge without requiring a tab projecting on a lateral side of the leader tape.

U.S. Pat. No. 5,857,634 discloses a locking system for preventing the rotation of a take-up reel of a tape drive when a tape cartridge is not inserted into the drive.

On the other hand, an example of the tape cartridge to be received in the digital linear tape drive is disclosed in Japanese Unexamined Patent Publication No. 2000-149491 (JP 2000-149491 A).

U.S. Pat. No. 6,241,171 discloses a tape drive in which a tape leader can be urged from a tape cartridge through a tape path to a take-up reel without using a buckling mechanism or a take-up leader.

The tape drive further comprises a magnetic tape head actuator assembly. The magnetic tape head actuator assembly is positioned between the take-up spool and the tape cartridge along a tape path defined by a plurality of rollers. During operation, the magnetic tape streams back and forth between the take-up spool and the tape cartridge, coming into close proximity to the magnetic head actuator assembly while streaming along the defined tape path. An example of such a magnetic tape head actuator assembly is disclosed in the above-mentioned U.S. Pat. No. 5,793,574.

Referring to FIG. 1, description will be made of the structure of an existing tape drive comprising a magnetic head actuator assembly. FIG. 1 is a plan view of the existing tape drive in the state where an upper cover is removed.

The tape drive 110 is adapted to receive a removable tape cartridge (not shown) and includes a take-up reel 111 in the interior thereof. The take-up reel 111 may be called a spool. The tape drive 110 comprises a generally rectangular housing (gear chassis) 112 having a common base. The base of the housing 112 has two spindle motors (reel motors) 113 and 114. The first spindle motor 113 has the take-up reel 111 permanently mounted to the base. The take-up reel 111 is dimensioned so as to accept a magnetic tape (not shown) streaming at a relatively high speed. The second spindle motor 114 is adapted to receive the removable tape cartridge. The removable tape cartridge is manually or automatically inserted into the tape drive 110 via a slot 1121 formed on the housing 112 of the tape drive 110 along the extending direction of the slot 1121.

When the tape cartridge is inserted into the slot 1121, the cartridge is engaged with the second spindle motor 114. Prior to rotation of the first and the second spindle motors 113 and 114, the tape cartridge is connected to the permanently mounted take-up reel 111 by means of a mechanical buckling mechanism. A number of rollers (guide rollers) 115 are positioned between the tape cartridge and the take-up reel 111 and guide the magnetic tape as it streams at a relatively high speed back and forth between the tape cartridge and the permanently mounted take-up reel 111.

The housing 112 is made of aluminum die-casting which is a non-magnetic material. Accordingly, the second spindle motor 114 is covered with a plate 116 of an iron-based magnetic material in order to inhibit magnetic leakage from a magnet (not shown) of the second spindle motor 114.

The tape drive 110 further comprises a magnetic tape head actuator assembly (hereinafter may be simply called "actuator assembly") 120. The actuator assembly 120 is positioned between the take-up reel 111 and the tape cartridge along a tape path (not shown) defined by the rollers 115. During operation, the magnetic tape streams back and forth between the take-up reel 111 and the tape cartridge, coming into close proximity to the actuator assembly 120 while streaming along the defined tape path.

The actuator assembly 120 is disposed on the base of the housing 112 and has a magnetic head assembly 130 (see FIG. 2) moving along and in proximity of a magnetic tape surface. The magnetic head assembly 130 may hereinafter be abbreviated "head assembly". On the base of the housing 112, a guide bar 117 is arranged to guide the head assembly 130 moving up and down in a direction perpendicular to the base of the housing 112.

Referring to FIGS. 2 to 4, description will be made of the structure of the actuator assembly 120.

FIG. 2 is a perspective view showing the actuator assembly 120. FIG. 3 is an exploded perspective view showing the actuator assembly 120 of FIG. 2, in which the actuator assembly is shown disassembled into the head assembly 130 and a head feeding mechanism 140 with the head feeding mechanism 140 further disassembled into a rotating part and a vertically moving part. FIG. 4 is a sectional view taken along a line A—A in FIG. 1.

As shown in FIG. 2, the actuator assembly 120 comprises the head assembly 130 and the head feeding mechanism 140. Herein, the vertical direction is a direction perpendicular to a plane of the base of the housing 112 in FIG. 1, i.e., the extending direction of the guide bar 117.

The head assembly 130 comprises a magnetic head 131 extending in the vertical direction, a head holder 132 holding the magnetic head 131 on its one side surface (hereinafter may be called "front surface"), and a pair of flexible printed circuits (hereinafter may be abbreviated to "FPC") 133. The FPCs 133 extend at the opposite side surface (hereinafter may be called "rear surface") to electrically connect the magnetic head 131 and an external circuit (not shown).

The head holder 132 comprises a head mounting portion 1321 and a pair of flanges 1322. On the head mounting portion 1321, the magnetic head 131 is mounted. The flanges 1322 extend rearward from opposite sides of an upper end of the head mounting portion 1321 in a direction perpendicular to the head mounting portion 1321 and are in parallel to each other. Each of the flanges 1322 has a screw hole for receiving a screw 134. By screwing screws 134 to a head lift 142 of the head feeding mechanism 140 through the screw holes, the head assembly 130 is coupled to the head lift 142 of the head feeding mechanism 140. The head mounting portion 1321 has an opening formed at the center thereof and behind the magnetic head 131 mounted thereon. Through the opening, one ends of the FPCs 133 are electrically connected to the magnetic head 131.

On the rear side of the head holder 132, the head feeding mechanism 140 is disposed with a lead screw 141 having a rotation center axis extending in the vertical direction. The head lift 142 of the head feeding mechanism 140 is engaged with the lead screw 141 and moves the head assembly 130 up and down following the rotation of the lead screw 141.

Referring to FIG. 3, description will be made of the head feeding mechanism 140.

The head feeding mechanism 140 comprises the lead screw 141, the head lift 142, a split nut 143, and a lead screw gear 144. The lead screw 141 is provided with an external thread and has a rotation center axis extending in the vertical direction. The head lift 142 has a generally rectangular shape with an opening formed at its center. The head lift 142 holds the head assembly 130 and moves the head assembly 130 up and down. The split nut 143 is located in the opening of the head lift 142 and fixed to the head lift 142. The split nut 143 has an internal thread 1431 to be engaged with the lead screw 141. The lead screw gear 144 is fixed to a lower end of the lead screw 141 to rotate the lead screw 141 around the rotation center axis when it is driven by another driving means (not shown). As a result, following the rotation of the lead screw 141 around the rotation center axis, the split nut 143 moves the head lift 142 in the vertical direction, i.e., the extending direction of the rotation center axis.

The head lift 142 has a bottom portion 1421 on the side of the lead screw gear 144, a pair of side wall portions 1422 extending upwards from opposite ends of the bottom portion 1421 and in parallel to each other, and a top portion 1424 bridging the side-wall portions 1422 at their upper ends. The bottom and the top portions 1421 and 1424 have circular openings formed at their centers, respectively. In the circular openings, bearings 145 and 146 for the lead screw 141 are disposed, respectively. The side wall portions 1422 have upper surfaces provided with screw holes 14221 to be engaged with the screws 134. Furthermore, the side wall portions 1422 are provided with nut holding grooves 14222 formed on inner surfaces of the side wall portions 1422 at positions near to the upper ends to hold the split nut 143.

The head lift 142 has a projecting portion 1425 formed on one of the side wall portions 1422 to project laterally outwards from the lower end thereof. The projecting portion 1425 has a guide groove for receiving a guide 147. The guide 147 is attached to the guide bar 117 (see FIG. 1) to be slidable in the vertical direction along the guide bar 117. The guide 147 serves to prevent the head lift 142 from rotating around the rotation center axis.

The split nut 143 has a pair of splits (slits) 1432 (only one being illustrated in the figure) oriented parallel to the rotation center axis and circumferentially spaced by 180 degrees from each other. The split nut 143 further has a pair of projections 1433 formed at its upper end to extend laterally outwards. The projections 1433 are fitted to the nut holding grooves 14222 of the side wall portions 1422. Thus, the internal thread 1431 of the split nut 143 is engaged with the external thread of the lead screw 141 so that the head lift 142 can be moved in the vertical direction along the rotation center axis of the lead screw 141 following the rotation of the lead screw 141.

The split nut 143 further has an annular groove formed on its outer periphery. A doughnut spring (ring spring) 148 is positioned in the annular groove. The doughnut spring 148 is a special coil spring formed into a doughnut-like shape. The doughnut spring 148 applies an inwardly directed adaptive compressive force on the split nut 143.

In the above-mentioned structure of the actuator assembly 120, the lead screw 141 of the head feeding mechanism 140 can rotate clockwise or counterclockwise. In this event, the head lift 142 and the head assembly 130 attached thereto move in the vertical direction along the rotation center axis following the rotation of the lead screw 141.

A combination of the split nut 143 and the doughnut spring 148 serves as a backlash preventing mechanism for eliminating backlash of the head lift 142, and therefore, of the actuator assembly 120. More in detail, in order to prevent the backlash of the head lift 142 with respect to the lead screw 141 during movement of the head lift 142 following the rotation of the lead screw 141, the doughnut spring 148 elastically deforms and inwardly presses the split nut 143 having the splits (or slits) 1432 to the lead screw 141.

The split nut is often subjected to mechanical shock, which causes the backlash in the actuator assembly. U.S. Pat. No. 5,793,574 mentioned above discloses an actuator assembly using a shock suppression sleeve. The shock suppression sleeve improves the resistance against backlash due to mechanical shock, or loose play resulting from wear or mechanical tolerances. It is noted here that the shock suppression sleeve also comprises a combination of the split nut and the doughnut spring and is applied to the magnetic head actuator assembly.

As will be understood from FIG. 4, the lead screw 141 has a lower end portion rotatably supported by the housing 112 through a bearing 151. The lead screw gear 144 is mounted on the bearing 151 through a washer 152 and a lift spring 153. The lead screw 141 has an upper end portion rotatably supported by a bearing holder 156 through another bearing 155. The bearing holder 156 is fixedly mounted on the housing 112. An E ring 157 is interposed between the bearing 155 and the external thread of the lead screw 141.

As described above, the existing magnetic head actuator assembly includes a combination of the split nut 143 and the doughnut spring 148 as the backlash preventing mechanism. However, each of the split nut 143 and the doughnut spring 148 has a special shape or structure and is therefore high in cost. Furthermore, it is difficult to obtain a stable inwardly directed pressing force applied to the lead screw 141 because of variation in elastic force of the split nut 143 and the doughnut spring 148.

In the existing head feeding mechanism 140, the split nut 143 for moving the head lift 142 following the rotation of the lead screw 141, the bearing 145 for the lead screw 141, and the guide 147 for inhibiting the rotation of the head lift 142 are formed as separate components. Therefore, the existing head feeding mechanism 140 is high in cost and is difficult to be assembled.

SUMMARY OF THE INVENTION

It is therefore an object of this invention to provide a head feeding mechanism which is used in a head actuator assembly having a backlash preventing mechanism capable of preventing backlash with a simple and inexpensive structure.

It is another object of this invention to provide a head feeding mechanism which can be produced at a reduced cost and a reduced number of assembling steps.

According to an aspect of this invention, a head feeding mechanism (40) is coupled with a head assembly (30) movable on a housing (12) in a vertical direction and is adapted to move the head assembly (30) up and down in an axial direction of a guide bar (17) arranged on the housing (12) and extending in the vertical direction. The head feeding mechanism (40) comprises a lead screw (41) provided with an external thread, a head lift body (42), and a backlash preventing mechanism (43).

The lead screw (41) has a rotation center axis (screw center axis) extending in parallel to the axial direction of the guide bar (17). The head lift body (42) is fixed to the head assembly (30) and has a nut (45) provided with an internal thread (451) to be engaged with the lead screw (41). The head lift body (42) has an integral structure formed by resin molding with a through hole for receiving the lead screw (41) inserted therethrough, a hollow opening formed at its center, and a guide portion (47). The guide portion (47) inhibits the rotation of the head lift body and guides the vertical movement of the head lift body along the rotation center axis. The backlash preventing mechanism (43) is placed in the hollow opening of the head lift body (42), and has an internal thread to be engaged with the external thread of the lead screw (41). The backlash preventing mechanism (43) continuously presses the head lift body (42) in one direction along the rotation center axis of the lead screw (41). Preferably, the nut (45) is integral with the head lift body (42). The guide portion (47) forms an arm and is engaged with the guide bar (17) at its end. The guide portion (47) allows the head lift body (42) to move up and down along the rotation center axis following the rotation of the lead screw (41) and inhibits the rotation of the head lift body (42) around the rotation center axis.

In the above-mentioned head feeding mechanism (40), the backlash preventing mechanism (43) includes a preload bushing (431) and a preload spring (432) comprising a compression coil spring. The preload bushing (431) is located in the hollow opening of the head lift body (42) and has an internal thread to be engaged with the external thread of the lead screw (41). The preload spring (432) is located in the hollow opening of the head lift body (42) at a position between the head lift body (42) and the preload bushing (431). The preload spring (432) applies the head lift body (42) with a pressing force along the rotation center axis of the lead screw. In the head feeding mechanism (40), it is preferable that the internal thread of the preload bushing (431) is offset by a half pitch with respect to the internal thread of the nut (45) of the head lift body (42).

It will readily be understood that the reference numerals enclosed in parentheses are affixed to facilitate understanding of this invention and no more than mere examples and that this invention is not restricted thereto.

As described above, the head feeding mechanism according to this invention prevents backlash by the preload spring comprising the compression coil spring and inserted between the preload bushing and the head lift body to press the head lift body in the axial direction of the lead screw. Thus, the head lift body is implemented as an integral structure with those components equivalent in function to the split nut, the bearing, and the guide in the existing mechanism. Therefore, the head feeding mechanism according to this invention is simplified in structure.

DESCRIPTION OF THE PREFERRED EMBODIMENTS

Now, a preferred embodiment of the present invention will be described with reference to the drawings.

Figure 5:
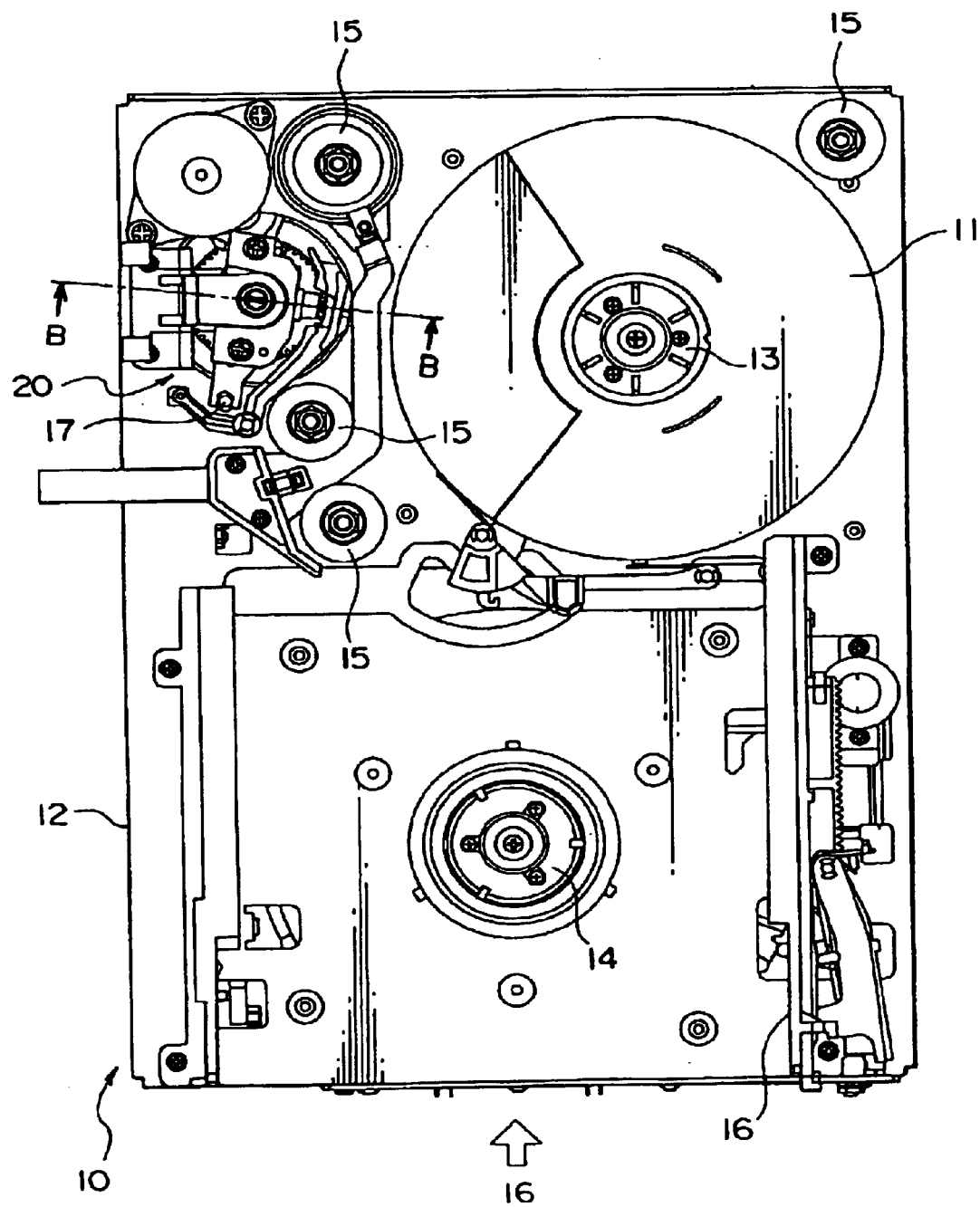
FIG. 5 is a plan view showing a tape drive according to an embodiment of this invention in the state where a top cover is removed.

Referring to FIG. 5, description will be made of the structure of a tape drive having a magnetic head actuator assembly including a head feeding mechanism according to this invention.

The tape drive 10 is adapted to receive a tape cartridge (not shown) and includes a take-up reel 11 in the interior thereof. The take-up reel 11 may be called a spool. The tape drive 10 comprises a generally rectangular housing (gear chassis) 12 having a common base. The base of the housing 12 has two spindle motors (reel motors) 13 and 14. The first spindle motor 13 has the take-up reel 11 permanently mounted to the base. The take-up reel 11 is dimensioned to accept a magnetic tape (not shown) streaming at a relatively high speed. The second spindle motor 14 is adapted to receive the removable cartridge. The removable tape cartridge is manually or automatically inserted into the tape drive 10 via slots 16 formed on the housing 12 of the tape drive 10 in a predetermined inserting direction.

When the tape cartridge is inserted into the slots 16, the tape cartridge is engaged with the second spindle motor 14. Prior to rotation of the first and the second spindle motors 13 and 14, the tape cartridge is connected to the permanently mounted take-up reel 11 by means of a mechanical buckling mechanism (not shown). A number of rollers (guide rollers) 15 are positioned between the tape cartridge and the permanently mounted take-up reel 11 and guide the magnetic tape as it streams at a relatively high speed back and forth between the tape cartridge and the permanently mounted take-up reel 11.

The housing 12 comprises a sheet metal chassis made of an iron-based magnetic material.

The tape drive 10 further comprises a magnetic head actuator assembly (hereinafter may simply be called "actuator assembly") 20. The actuator assembly 20 is positioned between the take-up reel 11 and the tape cartridge along a tape path (not shown) defined by the rollers 15. In operation, the magnetic tape streams back and forth between the take-up reel 11 and the tape cartridge, coming into close proximity to the actuator assembly 20 while streaming along the defined tape path.

The actuator assembly 20 is disposed on the base of the housing 12 and has a head assembly 30 (see FIG. 6) moving along and in proximity of a magnetic tape surface. On the base of the housing 12, a guide bar 17 is arranged to guide the head assembly 30 moving up and down in a direction perpendicular to the base of the housing 12.

Figure 6:
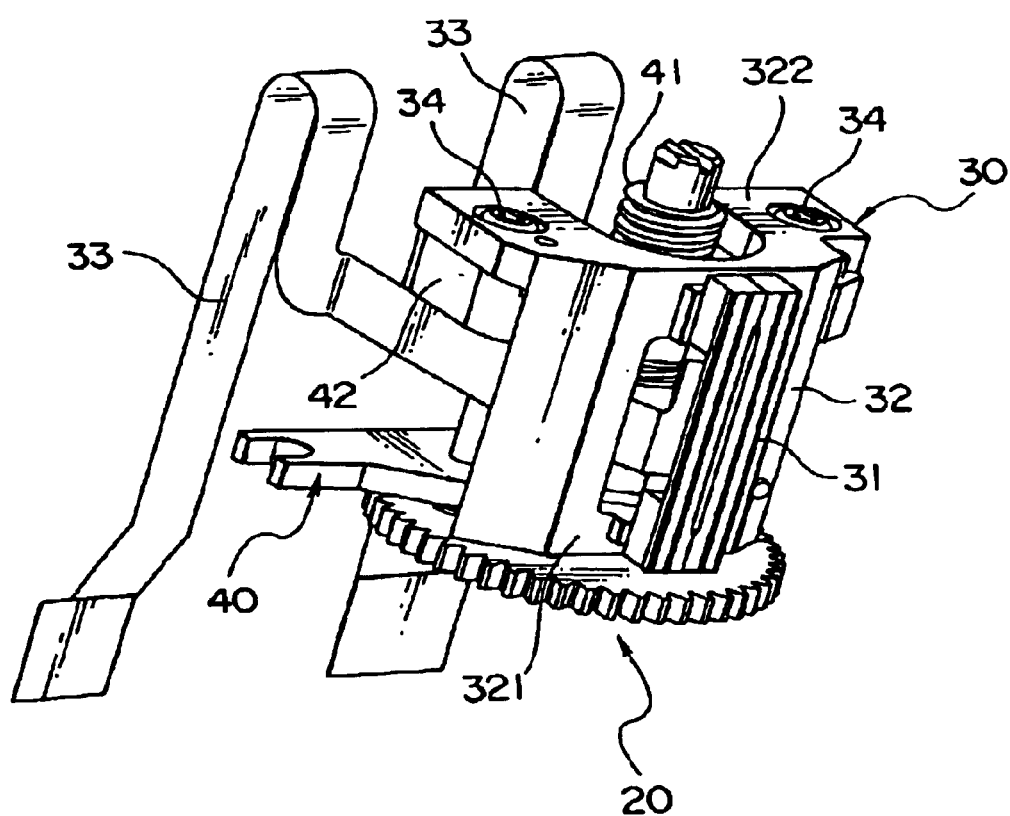
FIG. 6 is a perspective view showing a magnetic head actuator assembly in the tape drive illustrated in FIG. 5.
Figure 7:
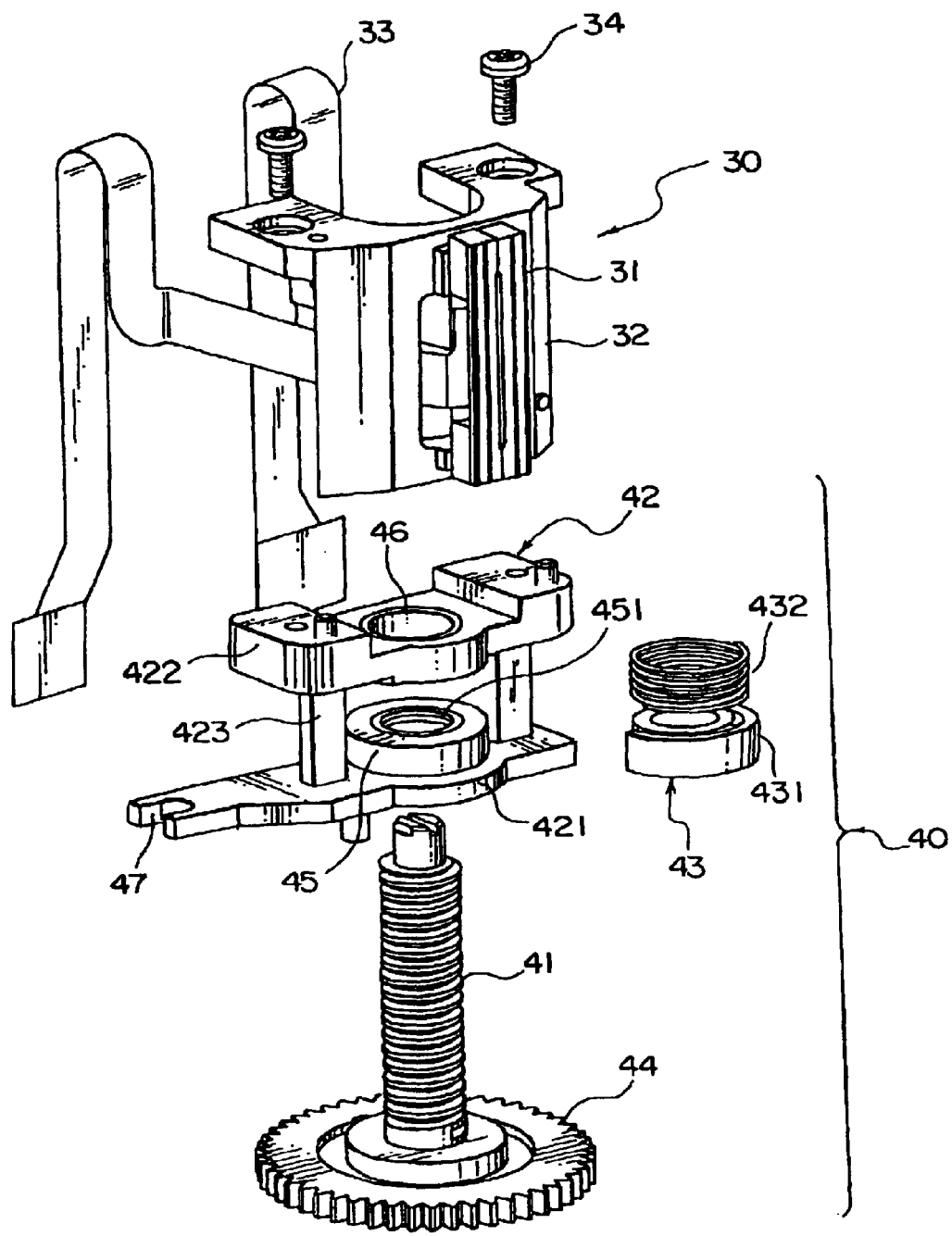
FIG. 7 is an exploded perspective view of the magnetic head actuator assembly in FIG. 6.
Figure 8:
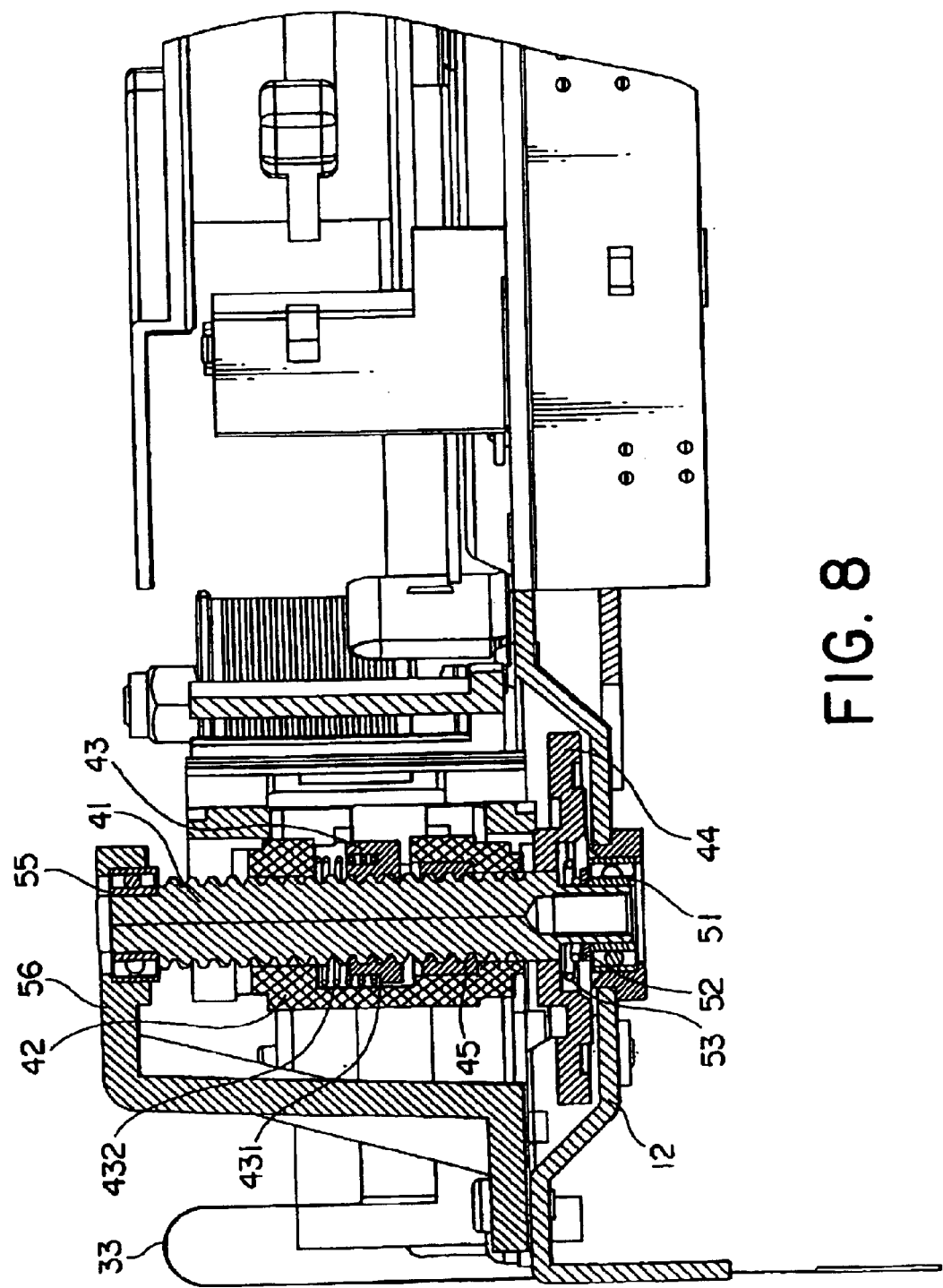
FIG. 8 is a sectional view taken along a line B—B in FIG. 5.

Referring to FIGS. 6 to 8, description will be made of the structure of the actuator assembly 20 including a head feeding mechanism 40 according to one embodiment of the present invention.

As shown in FIG. 6, the actuator assembly 20 comprises the head assembly 30 and the head feeding mechanism 40. Herein, the vertical direction is a direction perpendicular to a plane of the base of the housing 12 in FIG. 5, i.e., the extending direction of the guide bar 17.

The head assembly 30 comprises a magnetic head 31, a head holder 32, and a pair of flexible printed circuits (FPC) 33. The magnetic head 31 extends in the vertical direction. The head holder 32 holds the magnetic head 31 on its one side surface (hereinafter may be called "front surface"). A pair of FPCs 33 extend at the opposite side surface (hereinafter may be called "rear surface") to electrically connect the magnetic head 31 and an external circuit (not shown).

The head holder 32 comprises a head mounting portion 321 and a pair of flanges 322. On the head mounting portion 321, the magnetic head 31 is mounted. The flanges 322 extend rearward from opposite sides of an upper end of the head mounting portion 321 in a direction perpendicular to the head mounting portion 321 and are parallel to each other. Each of the flanges 322 has a screw hole for receiving a screw 34. By screwing the screws 34 through the screw holes to a head lift body 42 of the head feeding mechanism 40, the head assembly 30 is coupled to the head lift body 42 of the head feeding mechanism 40. The head mounting portion 321 has an opening formed at the center thereof behind the magnetic head 31. Through the opening, one ends of the FPCs 33 are electrically connected to the magnetic head 31.

On the rear side of the head holder 32, the head feeding mechanism 40 is disposed with a lead screw 41 having a rotation center axis (screw center axis) extending in the vertical direction. The head lift body 42 is engaged with the lead screw 41 and moves up and down together with the head assembly 30 following the rotation of the lead screw 41.

Referring to FIG. 7, description will be made of the head feeding mechanism 40 shown in FIG. 6.

The head feeding mechanism 40 comprises the lead screw 41 with an external thread, the head lift body 42, and a backlash preventing mechanism 43 for preventing the backlash of the actuator assembly 20.

The lead screw 41 has a rotation center axis extending in the vertical direction and is provided with a lead screw gear 44 attached to a lower end thereof. The lead screw gear 44 serves to rotate the lead screw 41 around the rotation center axis when it is driven by another driving means (not shown). The head lift body 42 moves up and down along the rotation center axis following the rotation of the lead screw 41 around the rotation center axis.

The head lift body 42 is a main component of this invention and is formed as an integral structure by resin molding. Specifically, the head lift body 42 is molded into a single unit comprising a base portion 421, a ceiling portion 422, and a semicylindrical portion 423. The base portion 421 and the ceiling portion 422 extend substantially in parallel to each other and are spaced in the vertical direction and connected to each other by the semicylindrical portion 423. The semicylindrical portion 423 has an upright gutter-like shape as a half-split cylinder, which is taken by cutting a hollow cylinder by a plane along the center axis thereof. Accordingly, the head lift body 42 has a generally I shape as seen from a lateral side. The head lift body 42 holds the head assembly 30 and moves up and down together with the head assembly 30. In the head lift body 42, the backlash preventing mechanism 43 is arranged inside of the hollow opening of the semicylindrical portion 423.

The backlash preventing mechanism 43 includes a pre-load bushing 431 and a preload spring 432 comprising a compression coil spring. The preload bushing 431 has an internal thread to be engaged with the external thread of the lead screw 41 when the preload bushing 431 is located in the hollow opening of the semicylindrical portion 423. The preload spring 432 is disposed in a compressed state between the head lift body 42 and the pre-load bushing 431.

The lead screw gear 44 is fixed to the lower end of the lead screw 41 and serves to rotate the lead screw 41 around the rotation center axis when it is driven by another driving means (not shown). The lead screw 41 is engaged with an internal thread 451 of a nut 45 (will later be described) mounted on the head lift body 42. Accordingly, the rotation of the lead screw 41 around the rotation center axis thereof moves the head lift body 42 in the vertical direction coincident with the extending direction of the rotation center axis, in cooperation with the preload bushing 431.

Next, description will be made of the structure of the head lift body 42 more in detail. The head lift body 42 has an integral structure formed by resin molding with the nut 45, which has the internal thread 451 to be engaged with the lead screw 41, a plain or sliding bearing 46 (will later be described), and a guide portion 47 (will later be described).

Figure 1:
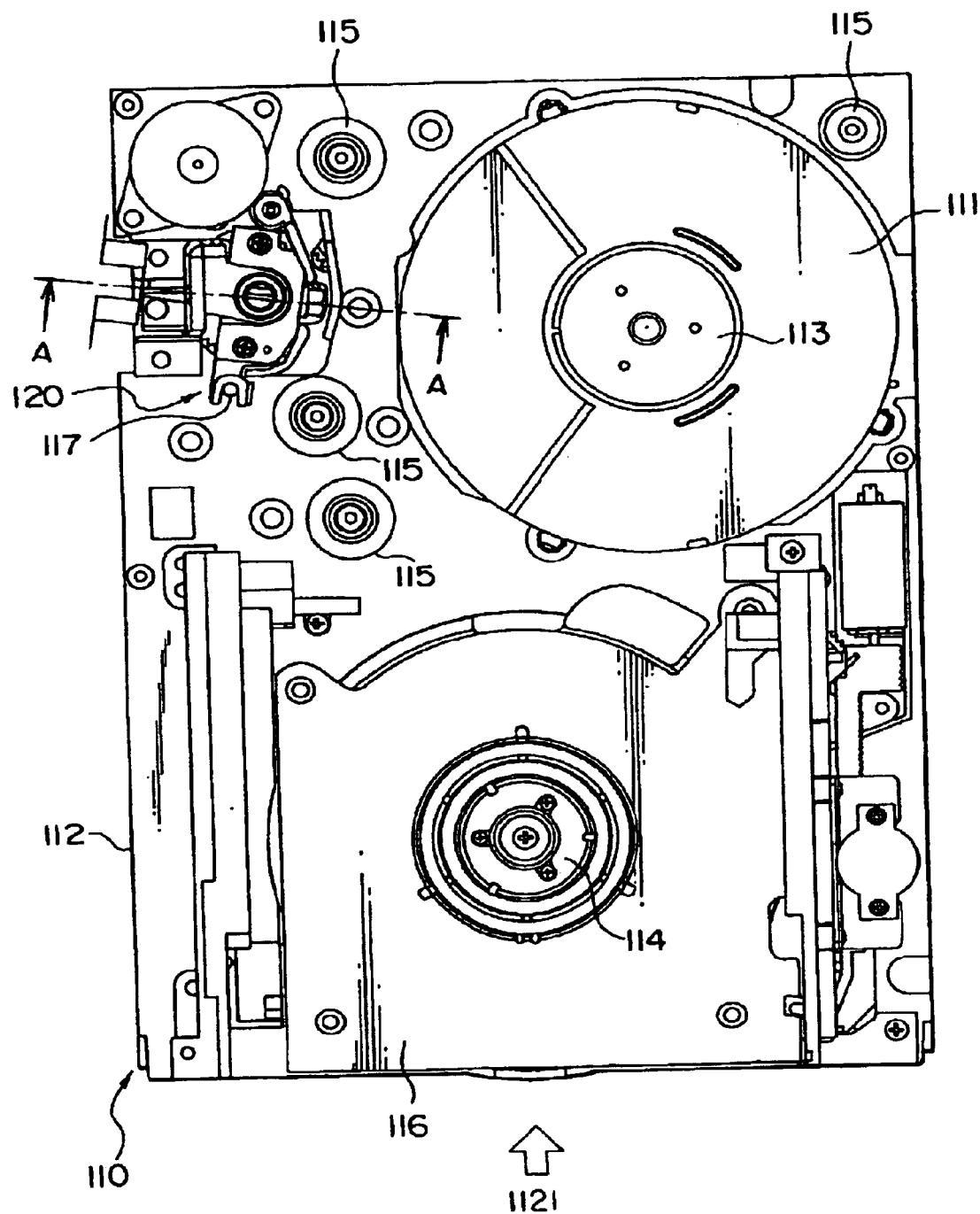
FIG. 1 is a plan view showing an existing tape drive in the state where a top cover is removed.
Figure 2:
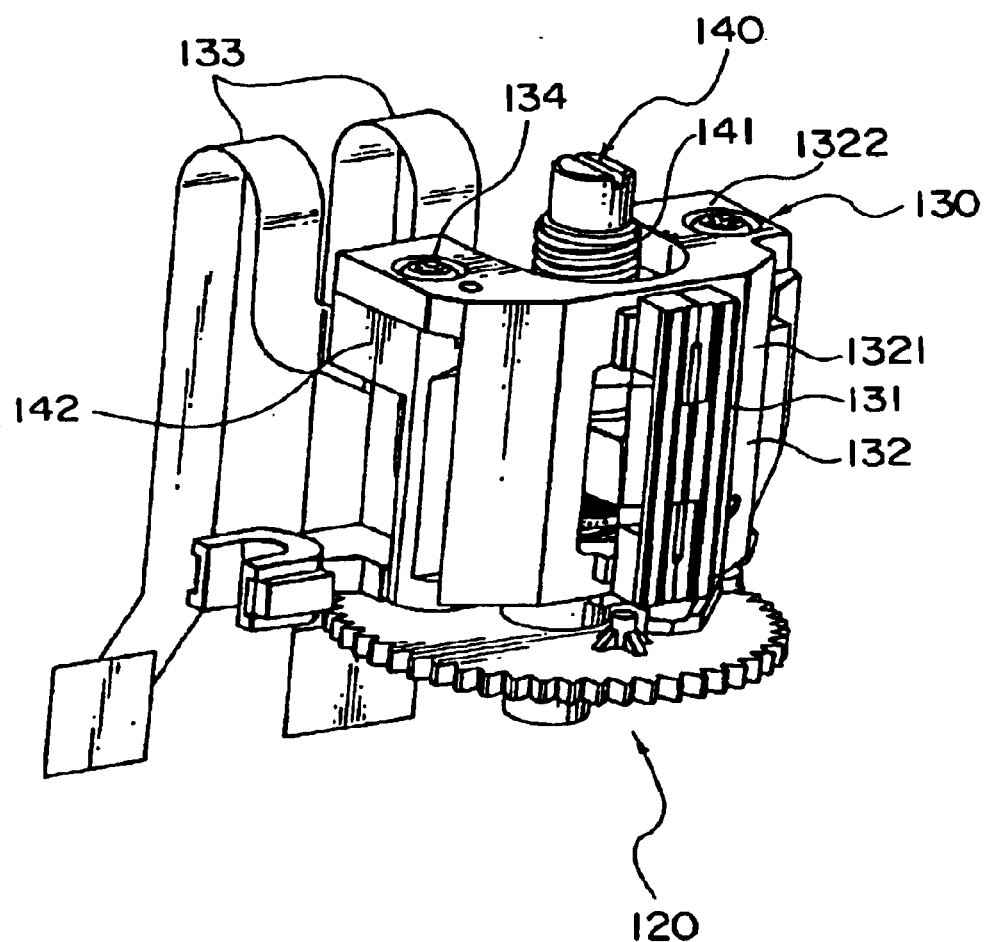
FIG. 2 is a perspective view showing a magnetic head actuator assembly in the tape drive illustrated in FIG. 1.
Figure 3:
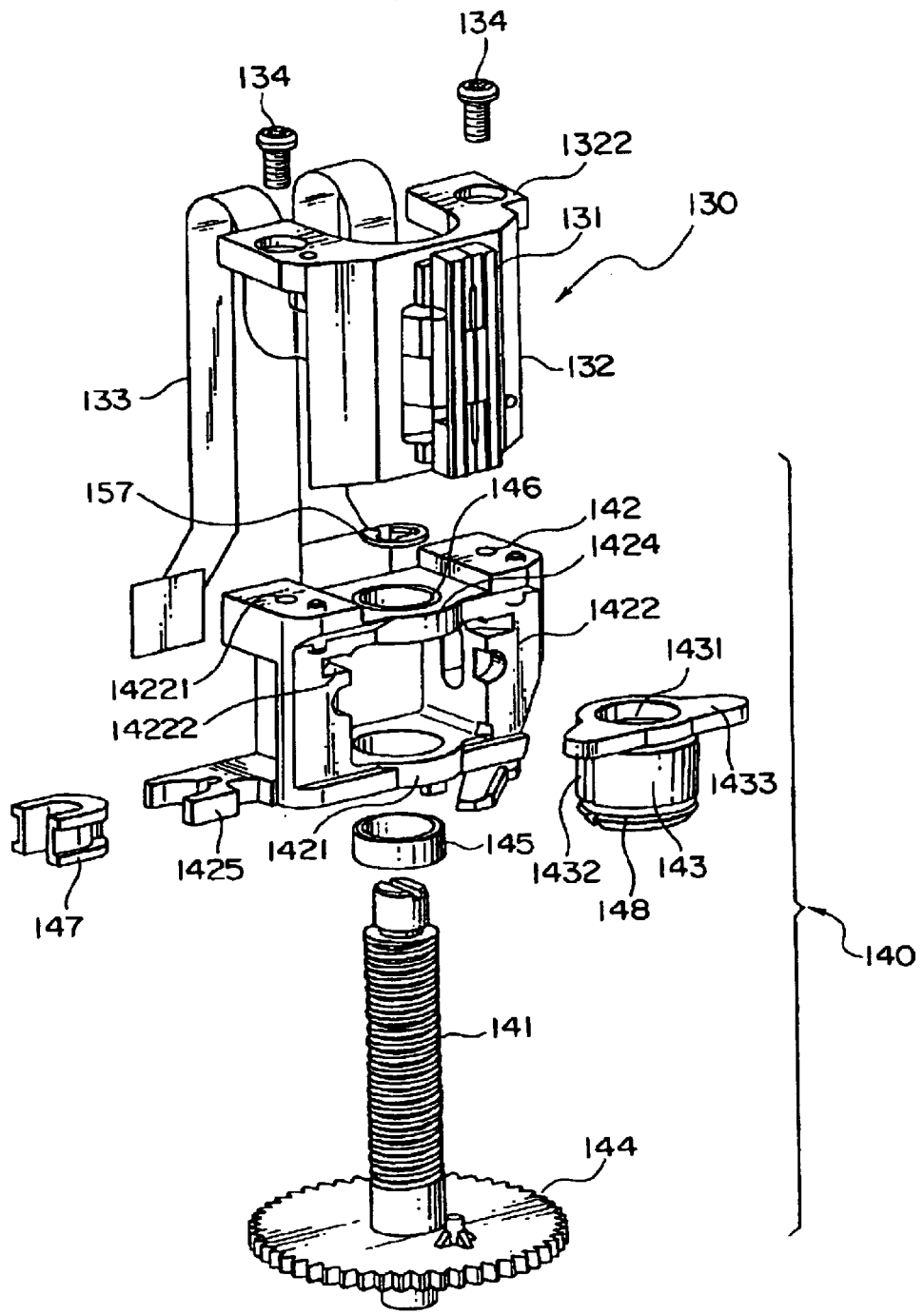
FIG. 3 is an exploded perspective view of the magnetic head actuator assembly in FIG. 2.
Figure 4:
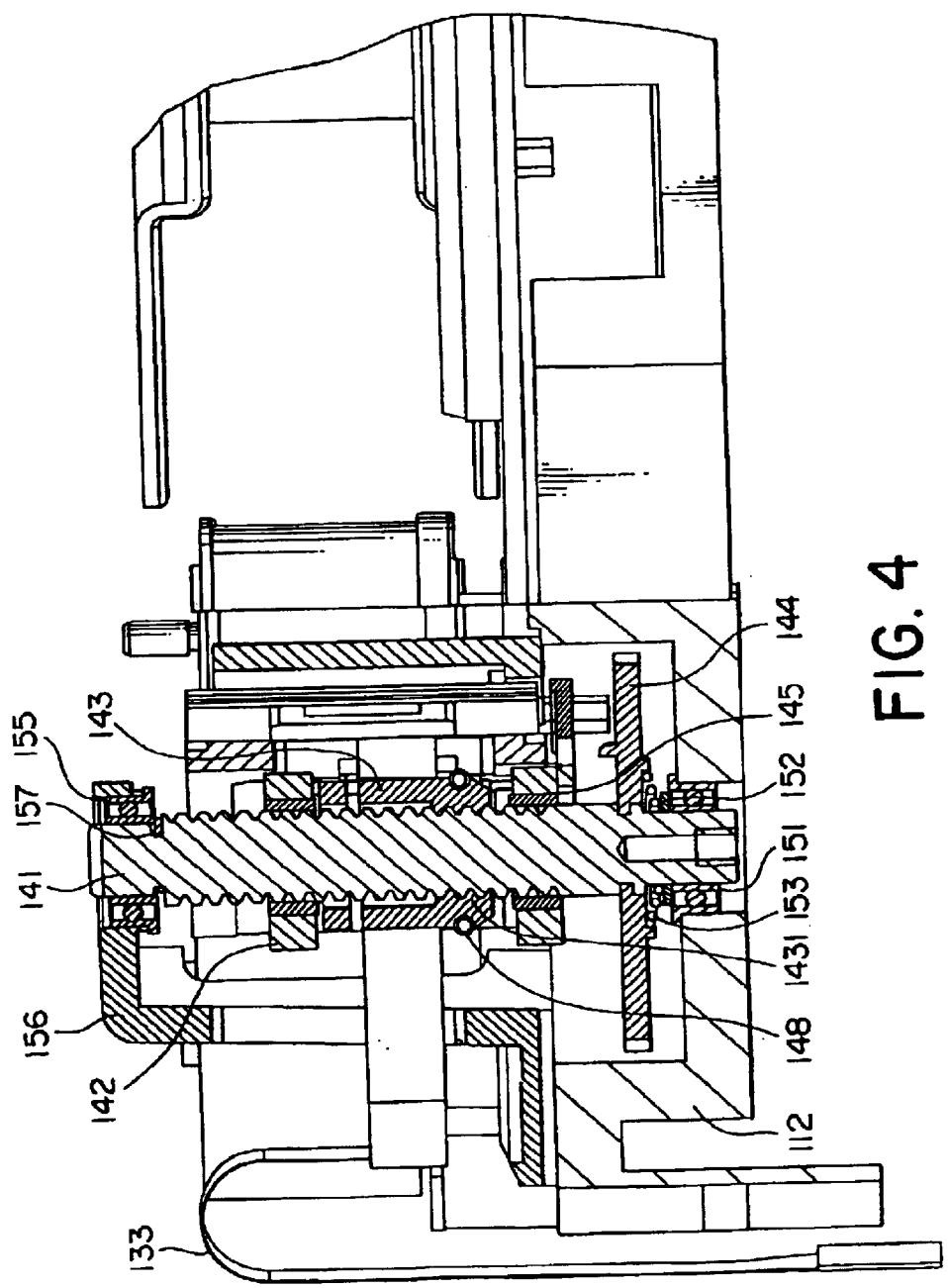
FIG. 4 is a sectional view taken along a line A—A in FIG. 1.

As described above, the above-mentioned head lift body 42 has an integral structure formed by resin molding with those components equivalent in function to the split nut 143, the bearing 146, and the guide 147 as separate components of the existing head feeding mechanism 140 shown in FIG. 3. Thus, the three separate components in the existing mechanism can be implemented by a single integral component.

As described above, the head lift body 42 has a main portion composed of the base portion 421 defining a lower end surface, the ceiling portion 422 defining an upper end surface, and the semicylindrical portion 423 with the hollow opening. Each of the base portion 421 and the ceiling portion 422 has a pair of peaks extending outward from opposite sides of the semicylindrical portion 423. As seen in a direction perpendicular to the extending direction of the peaks, i.e., as seen from the lateral side, the head lift body 42 has a generally I shape. The base portion 421 and the ceiling portion 422 have circular openings formed at positions corresponding to the hollow opening of the semicylindrical portion 423 to form the plain or sliding bearings 46 which receive the lead screw 41 inserted therethrough.

At the position of the above-mentioned circular opening to receive the lead screw 41 inserted therethrough and in the hollow opening of the semicylindrical portion 423, the base portion 421 is provided with the nut 45 having the internal thread 451 to be engaged with the lead screw 41. In FIG. 7, the nut 45 is fixedly mounted on the upper surface of the base portion 421 in the hollow opening of the semicylindrical portion 423. Alternatively, the nut 45 may be integrally molded, for example, embedded in the base portion 421 at that position.

One of the peaks of the base portion 421 laterally extends as an arm to the length longer than the other peak and has the guide portion 47 of a generally U shape at its end. The guide portion 47 is fitted and attached to the guide bar 17 illustrated in FIG. 5 so as to be slidable in the vertical direction. The guide portion 47 serves to prevent the rotation of the head lift body 42 around the rotation central axis.

The ceiling portion 422 has a pair of screw holes in its peaks engaged with the screws 34, respectively. By screwing the screws 34 into the screw holes, the head assembly 30 is fixed to the head lift body 42. The hollow opening of the semicylindrical portion 423 serves to receive the backlash preventing mechanism 43 comprising the preload bushing 431 and the preload spring 432.

The preload bushing 431 comprises a cylindrical portion with an internal thread formed on its inside surface, an external annular receiving portion, and a semicylindrical wall portion. The external annular receiving portion extends radially outward at the lower end of the cylindrical portion to serve as a stopper for the preload spring 432. The semicylindrical wall portion extends upward from an outer periphery of the receiving portion in an area corresponding to an approximately half circle. Accordingly, a semi-annular gap is formed between the cylindrical portion and the semicylindrical portion. As shown in FIG. 8, the preload spring 432 is partially received in the semi-annular gap and is disposed in a compressed state between the annular receiving portion of the preload bushing 431 and the lower surface of the ceiling portion 422 of the head lift body 42. Furthermore, both ends of the semicylindrical wall portion of the preload bushing 431 inhibit the rotation of the preload bushing 431 by engagement with edges of the semicylindrical portion 423 when the preload bushing 431 is mounted into the head feeding mechanism 40.

The preload spring 432 comprises a compression coil spring. By the preload spring 432, the preload bushing 431 is continuously applied with a downward pressing force along the rotation center axis of the lead screw 41 while the head lift body 42 is continuously applied with an upward pressing force along the rotation center axis of the lead screw 41. As the guide portion 47 is integrally formed with the head lift body 42, the guide portion 47 is continuously applied with the upward pressing force along the rotation center axis of the lead screw 41, also.

Next, referring to FIG. 8 in addition, description will be made of the function of the backlash preventing mechanism 43.

As described above, the backlash preventing mechanism 43 comprises a combination of the pre-load bushing 431 and the pre-load spring 432, and serves to prevent backlash of the actuator assembly 20. In detail, before assembling the actuator assembly 20, the internal thread of the preload bushing 431 is offset by a half pitch with respect to the internal thread 451 of the nut 45. In this state, the lead screw 41 is inserted successively into the bearing (not shown) of the base portion 421, the nut 45, the preload bushing 431, the preload spring 432, and the bearing 46 of the ceiling portion 422.

As described above, the preload spring 432 applies the downward pressing force to the preload bushing 431 along the rotation center axis of the lead screw 41 and the upward pressing force to the head lift body 42 along the rotation center axis of the lead screw 41. When the lead screw 41 is rotated clockwise or counterclockwise, the head lift body 42 moves up or down along the rotation center axis of the lead screw 41. During the movement, downward flanks of the internal thread of the preload bushing 431 are continuously kept in frictional contact with upward flanks of the external thread of the lead screw 41. On the other hand, downward flanks of the internal thread 451 of the nut 45 fixed to the head lift body 42 are continuously kept in frictional contact with upward flanks of the external thread of the lead screw 41. As a result, it is possible to prevent backlash between the lead screw 41 and the head lift body 42 during movement following the rotation of the lead screw 41.

In comparison with the split nut and the doughnut spring used as the backlash preventing mechanism in the existing head feeding mechanism, the preload bushing 431 and the preload spring 432 are inexpensive because no special shape or structure is required. In addition, because of little variation in elastic force of the preload bushing 431 and the preload spring 432, it is possible to obtain stable pressing force along the rotation center axis of the lead screw 41.

As will be understood from FIG. 8, the lower end portion of the lead screw 41 is rotatably fixed to the housing 12 through the bearing 51. The lead screw gear 44 is mounted on the bearing 51 through the washer 52 and the lift spring 53. The upper end portion of the lead screw 41 is rotatably fixed to the bearing holder 56 through the bearing 55. The bearing holder 56 is fixedly mounted on the housing 12.

While the present invention has been described in detail in conjunction with the preferred embodiment thereof, the present invention is not limited to the foregoing description but can be modified in various manners without departing from the scope of the invention set forth in appended claims. For example, the semicylindrical portion of the head lift body may have any polygonal cylindrical shape as far as molding is possible or may comprise a plurality of columnar portions.

What is claimed is:

1. A head feeding mechanism for moving a head assembly in a vertical direction perpendicular to a housing base, said head feeding mechanism comprising:

a lead screw having an external thread formed on an outer surface thereof, said lead screw being mounted on said housing base to be rotatable around a screw center axis extending in said vertical direction;

a head lift body integrally formed as a head lift assembly by resin molding and mounted on said lead screw above said housing base so as to be nonrotatable but movable in the vertical direction, said head lift assembly comprising a portion for fixedly supporting the head assembly thereon, a hollow portion, a vertical through-hole which includes said hollow portion and which receives said lead screw passing therethrough, and a guide portion slidably fitted to a guide bar extending in the vertical direction;

a nut embedded in a bottom of said hollow portion to be integral with said head lift body, said nut having an internal thread formed thereon for engaging with said external thread of said lead screw; and a backlash preventing mechanism placed in said hollow portion of said head lift body and having an internal thread formed thereon for engaging with the external thread of said lead screw;

wherein said backlash preventing mechanism continuously presses said head lift body in a first direction along the screw center axis of said lead screw and continuously presses itself in a second direction opposite to the first direction.

2. A head feeding mechanism as claimed in claim 1, wherein the guide bar is mounted on said housing base, and said guide portion allows said head lift body to move up and down in the vertical direction following rotation of said lead screw but inhibits rotation of said head lift body around the screw center axis.

3. A head feeding mechanism as claimed in claim 1, wherein said backlash preventing mechanism comprises:

a preload bushing positioned in the hollow portion of said head lift body and having the internal thread formed thereon, and a preload spring to apply said head lift body with a pressing force in the first direction.

4. A head feeding mechanism as claimed in claim 3, wherein said preload spring comprises a compression coil spring, and is positioned in said hollow portion between said head lift body and said preload bushing.

5. A head feeding mechanism as claimed in claim 3, wherein said internal thread of said preload bushing is offset by a half pitch with respect to the internal thread of said nut of said head lift body.

6. A tape drive for writing and reading information to a magnetic tape, said tape drive comprising:

a housing having a housing base;

a head assembly having a magnetic head for magnetically writing and reading information to the magnetic tape; and a head feeding mechanism for moving said head assembly in a vertical direction perpendicular to said housing base, wherein the head feeding mechanism is mounted on said housing base and fixedly supports said head assembly, said head feeding mechanism comprising:

a lead screw having an external thread formed on an outer surface thereof, said lead screw being mounted on said housing base to be rotatable around a screw center axis extending in said vertical direction;

a head lift body integrally formed as a head lift assembly by resin molding and mounted on said lead screw above said housing base so as to be nonrotatable but movable in the vertical direction, said head lift assembly comprising a portion for fixedly supporting the head assembly thereon, a hollow portion, a vertical through hole which includes said hollow portion and which receives said lead screw passing therethrough, and a guide portion slidably fitted to a guide bar extending in the vertical direction;

a nut embedded in a bottom of said hollow portion to be integral with said head lift body, said nut having an internal thread formed thereon for engaging with said external thread of said lead screw; and a backlash preventing mechanism placed in said hollow portion of said head lift body and having an internal thread formed thereon for engaging with the external thread of said lead screw;

wherein said backlash preventing mechanism continuously presses said head lift body in a first direction along the screw center axis of said lead screw and continuously presses itself in a direction opposited to the first direction.

* * * * *